United States Patent
Xing et al.

(10) Patent No.: US 12,464,555 B2
(45) Date of Patent: Nov. 4, 2025

(54) SYSTEMS AND METHODS FOR MANAGING RESOURCES FOR SL COMMUNICATIONS

(71) Applicant: ZTE CORPORATION, Guangdong (CN)

(72) Inventors: Weimin Xing, Shenzhen (CN); Youxiong Lu, Shenzhen (CN); Haigang He, Shenzhen (CN)

(73) Assignee: ZTE Corporation, Shenzhen (CN)

( * ) Notice: Subject to any disclaimer, the term of this patent is extended or adjusted under 35 U.S.C. 154(b) by 462 days.

(21) Appl. No.: 18/096,372

(22) Filed: Jan. 12, 2023

(65) Prior Publication Data
US 2023/0156775 A1    May 18, 2023

Related U.S. Application Data

(63) Continuation of application No. PCT/CN2020/102092, filed on Jul. 15, 2020.

(51) Int. Cl.
*H04W 72/563* (2023.01)
*H04W 72/02* (2009.01)
*H04W 72/25* (2023.01)

(52) U.S. Cl.
CPC ......... *H04W 72/563* (2023.01); *H04W 72/02* (2013.01); *H04W 72/25* (2023.01)

(58) Field of Classification Search
None
See application file for complete search history.

(56) References Cited

U.S. PATENT DOCUMENTS

| | | | | |
|---|---|---|---|---|
| 2021/0153167 A1* | 5/2021 | Sarkis | ......... | H04W 72/56 |
| 2021/0314916 A1* | 10/2021 | Fouad | ......... | H04W 72/02 |
| 2022/0394675 A1* | 12/2022 | Zhou | ......... | H04W 74/0808 |
| 2023/0171761 A1* | 6/2023 | Salim | ......... | H04W 72/563 |
| | | | | 370/329 |

FOREIGN PATENT DOCUMENTS

| | | |
|---|---|---|
| CN | 110024459 A | 7/2019 |
| CN | 111034293 A1 | 4/2020 |
| CN | 111356240 A | 6/2020 |
| EP | 3 672 133 A1 | 6/2020 |
| WO | WO-2018/174630 A1 | 9/2018 |
| WO | WO-2020/024208 A1 | 2/2020 |

OTHER PUBLICATIONS

Fraunhofer HHI: "Remaining Issues in Resource Allocation for Mode 2 NR V2X" 3GPP TSG RAN WG1 #100bis-e; R1-2001978; Apr. 30, 2020; e-Meeting (3 pages).

(Continued)

*Primary Examiner* — Robert M Morlan
(74) *Attorney, Agent, or Firm* — Foley & Lardner LLP

(57) ABSTRACT

Systems and methods for wireless communications are disclosed herein. In some arrangements, a wireless communication device determines whether a resource of a first resource set excluded from a second resource set is associated with a valid priority, and in response to determining that the resource excluded from the second resource set is associated with the valid priority, the wireless communication device reports reevaluation of the resource to one or more higher layers.

18 Claims, 4 Drawing Sheets

(56) References Cited

OTHER PUBLICATIONS

Intel Corporation: "Outcome of email thread [100e-NR-5G_V2X_NRSL-RA_Mode2-01]" 3GPP TSG RAN WG1 Meeting #100-E; R1-2001344; Mar. 6, 2020; e-Meeting (11 pages).
International Search Report and Written Opinion for PCT Appl. No. PCT/CN2020/102092, dated Apr. 15, 2021 (10 pages).
Nokia et al.: "Corrections on NR V2X" 3GPP TSG RAN Meeting #101-e; R1-2005158; Jun. 5, 2020; e-Meeting (15 pages).
First Office Action for CN Appl. No. 202080102757.5, dated Mar. 13, 2025 (with English translation, 20 pages).
LG Electronics, "Feature lead summary#2 for AI 7.2.4.5 Physical layer procedures for sidelink", 3GPP TSG RAN WG1 #100, R1-2001338, Mar. 6, 2020, e-Meeting (53 pages).
Office Action for KR Appl. No. 10-2023-7001627, dated Apr. 28, 2025 (with English translation, 9 pages).

\* cited by examiner

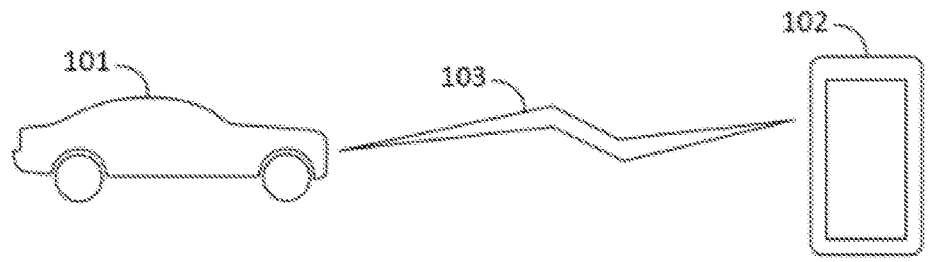
FIG. 1
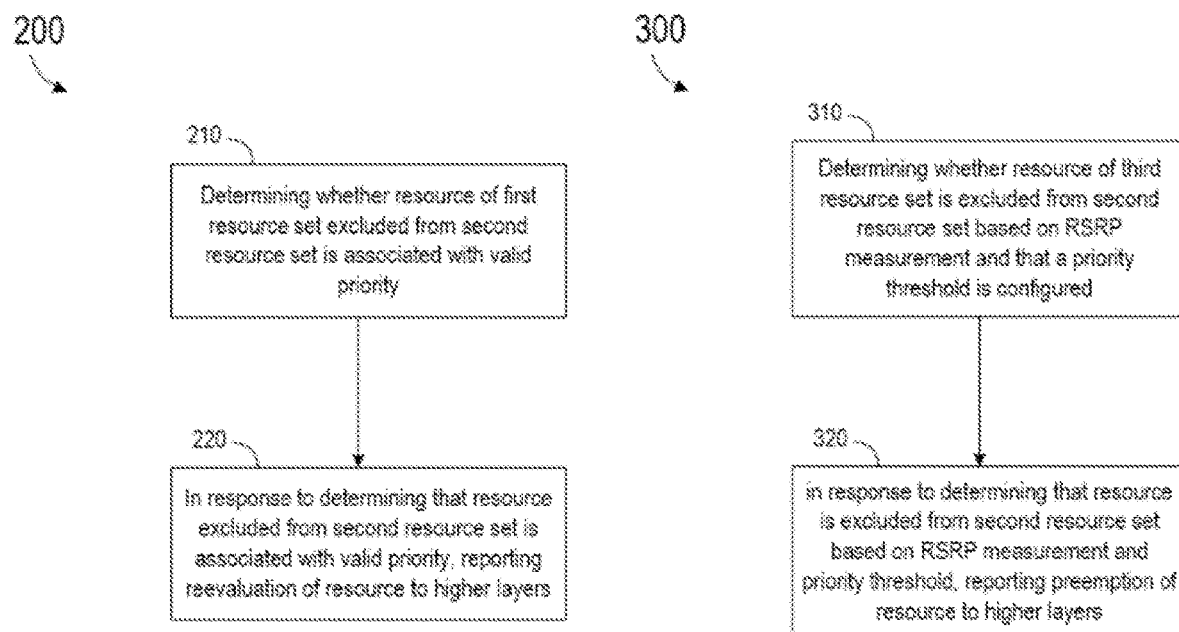
FIG. 2                    FIG. 3

SYSTEMS AND METHODS FOR MANAGING RESOURCES FOR SL COMMUNICATIONS

CROSS-REFERENCE TO RELATED APPLICATION

This application claims the benefit of priority under 35 U.S.C. § 120 as a continuation of PCT Patent Application No. PCT/CN2020/102092, filed on Jul. 15, 2020, the disclosure of which is incorporated herein by reference in its entirety.

TECHNICAL FIELD

The present disclosure relates to the field of telecommunications, and in particular, to reevaluation and preemption in Sidelink (SL) communications.

BACKGROUND

SL communication corresponds to wireless radio communication directly between two or more user equipment devices (UEs). In SL communication, two or more UEs that are geographically proximate to each other can directly communicate with one another without communicating through a core network or a base station (BS) such as but not limited to, an Evolved Node B (eNB), a next Generation Node B (gNB), and so on.

SUMMARY

In some embodiments, a wireless communication method includes determining, by a wireless communication device, whether a resource of a first resource set excluded from a second resource set is associated with a valid priority, and in response to determining that the resource excluded from the second resource set is associated with the valid priority, reporting reevaluation of the resource to one or more higher layers.

In some examples, determining whether the resource excluded from the second resource set is associated with the valid priority comprises determining whether the resource is excluded from the second resource set by a hypothetical Sidelink (SL) Control Information (SCI).

In some examples, determining that the resource excluded from the second resource set is not associated with the valid priority comprises determining that the resource is excluded by a hypothetical SCI.

In some embodiments, a wireless communication method includes determining, by a wireless communication device, that a resource of a third resource set is excluded from a second resource set based on a Reference Signal Receive Power (RSRP) measurement and that a priority threshold $prio_{pre}$ is configured, and in response to determining that the resource is excluded based on the RSRP measurement and that the priority threshold $prio_{pre}$ is configured, reporting preemption of the resource to one or more higher layers.

In some examples, in response to determining that the priority threshold $prio_{pre}$ is configured, the preemption of the resource is reported in response to determining that (1) the resource is not a member of the second resource set due to the RSRP measurement, (2) the associated priority $prio_{RX}$ is less than the priority threshold $prio_{pre}$, and (3) the transmission priority $prio_{TX}$ is greater than the reception priority $prio_{RX}$.

In some examples, the method further comprises in response to determining that the priority threshold $prio_{pre}$ is not configured and determining that the resource is not a member of the second resource set due to the RSRP measurement performed for the SCI with valid priority, reporting, by the wireless communication device, the preemption of the resource.

In some embodiments, a wireless communication method includes determining, by a wireless communication device, that a hypothetical SCI has a periodicity value, the periodicity value being a value from a value set, and determining, by the wireless communication device, whether a resource of a first resource set is to be excluded from a second resource set using the hypothetical SL SCI.

In some examples, the wireless communication device has not monitored a slot. The hypothetical SCI is received hypothetically in the slot. A resource reservation field in the hypothetical SCI is set to the periodicity value.

In some examples, the value set is one of a configured set received from higher layer or a subset of the configured set from the higher layer, the subset comprises values greater than or greater than or equal to a low boundary of the value set. In some examples, the low boundary is a value configured or preconfigured by a higher layer, a network, or a base station, or the low boundary is one of multiple values configured or preconfigured by the higher layer, the network, or the base station. Each of the multiple values maps to a priority. The one of the multiple values corresponds to a SL priority one of a priority of packets the wireless communication device is to transmit or a priority of the first resource set.

In some embodiments, a wireless communication method includes receiving, by a wireless communication device from a higher layer, a trigger indicating that the higher layer requests the wireless communication device to provide a second resource set, receiving, by the wireless communication device from the higher layer, a flag indicating whether a hypothetical SCI is used to exclude resources from the second resource set, and in response to the flag being set, determining, by the wireless communication device, the second resource set using a SCI received by the wireless communication device and without using a hypothetical SCI.

In some examples, the wireless communication device has not monitored a slot. The hypothetical SCI is hypothetically received in the slot.

In some examples, the wireless communication method further comprises determining that the flag has not been received, and in response to determining that the flag has not been received, determining, by the wireless communication device, the second resource set from the first resource set using the SCI received by the wireless communication device and the hypothetical SCI.

The above and other aspects and their implementations are described in greater detail in the drawings, the descriptions, and the claims.

BRIEF DESCRIPTION OF THE DRAWINGS

Various example embodiments of the present solution are described in detail below with reference to the following figures or drawings. The drawings are provided for purposes of illustration only and merely depict example embodiments of the present solution to facilitate the reader's understanding of the present solution. Therefore, the drawings should not be considered limiting of the breadth, scope, or applicability of the present solution. It should be noted that for clarity and ease of illustration, these drawings are not necessarily drawn to scale.

FIG. 1 is a schematic diagram of a SL communication between UEs, in accordance with some embodiments of the present disclosure.

FIG. 2 is a flow diagram illustrating an example wireless communication method for reporting reevaluation of resources, in accordance with some embodiments of the present disclosure.

FIG. 3 is a flow diagram illustrating an example wireless communication method for reporting preemption of resources, in accordance with some embodiments of the present disclosure.

DETAILED DESCRIPTION OF EXAMPLE EMBODIMENTS

Figures 4, 5:
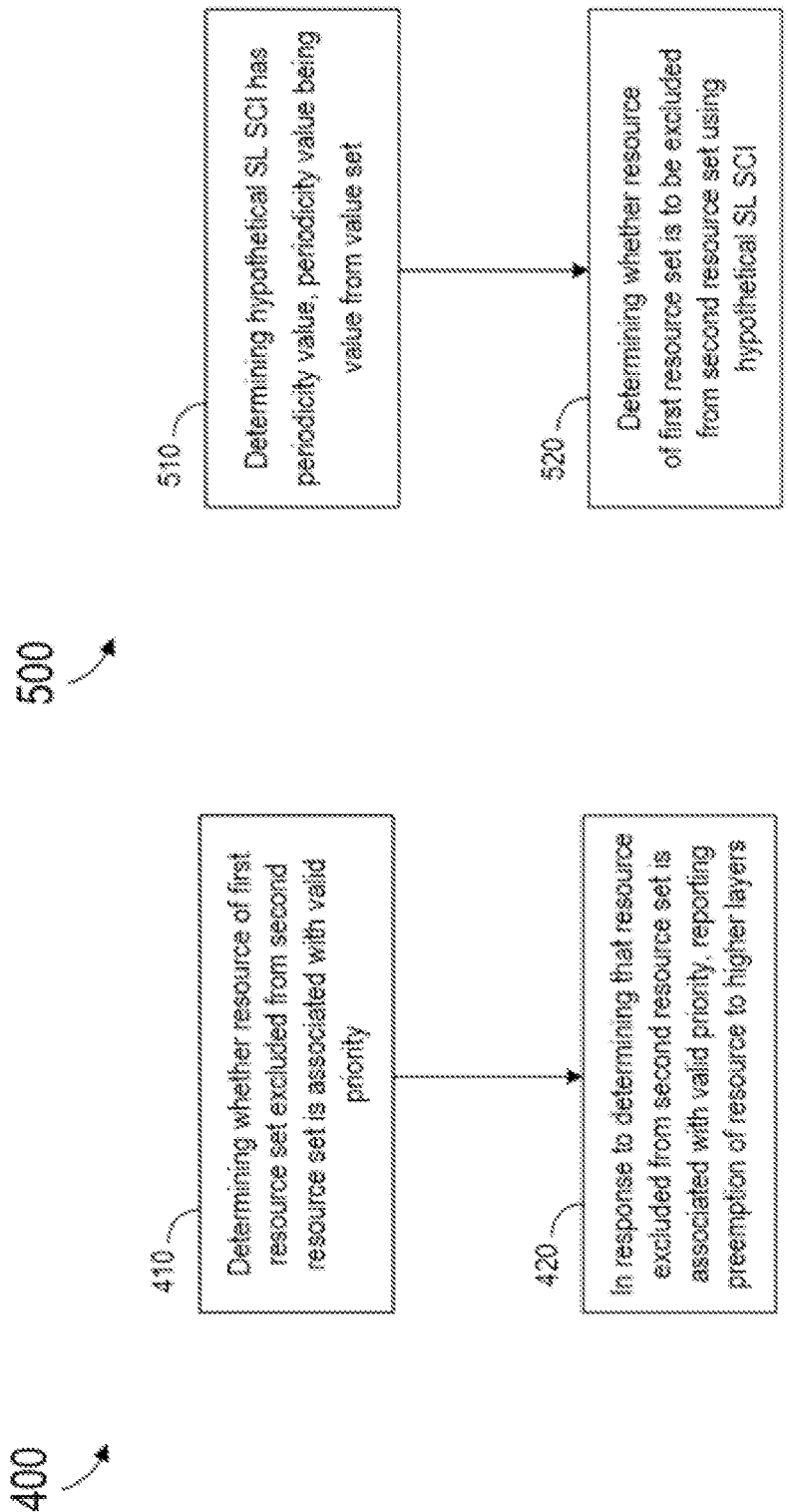
FIG. 4 is a flow diagram illustrating an example wireless communication method for reporting preemption of resources, in accordance with some embodiments of the present disclosure.
FIG. 5 is a flow diagram illustrating an example wireless communication method for reporting preemption or re-evaluation of resources, in accordance with some embodiments of the present disclosure.

Various example embodiments of the present solution are described below with reference to the accompanying figures to enable a person of ordinary skill in the art to make and use the present solution. As would be apparent to those of ordinary skill in the art, after reading the present disclosure, various changes or modifications to the examples described herein can be made without departing from the scope of the present solution. Thus, the present solution is not limited to the example embodiments and applications described and illustrated herein. Additionally, the specific order or hierarchy of blocks in the methods disclosed herein are merely example approaches. Based upon design preferences, the specific order or hierarchy of blocks of the disclosed methods or processes can be re-arranged while remaining within the scope of the present solution. Thus, those of ordinary skill in the art will understand that the methods and techniques disclosed herein present various blocks or acts in a sample order, and the present solution is not limited to the specific order or hierarchy presented unless expressly stated otherwise.

FIG. 1 is a schematic diagram of a SL communication link 103 between UEs 101 and 102, in accordance with some embodiments of the present disclosure. Referring to FIG. 1, a type of SL communication is a Vehicle-to-Anything (V2X) communication, including not only communications between vehicles, but also communications between a vehicle and other types of devices. For example, communication between a Vehicle UE (V-UE) and a Pedestrian UE (P-UE) is referred to as Vehicle-to-Pedestrian (V2P) communication. Accordingly, while the UE 101 is a V-UE, the UE 102 can be another V-UE, a P-UE, and so on. The UE 101 communicates with the UE 102 via the SL communication link 103. In some examples, the SL communication link 103 can be used for uplink and downlink communications between the UE 101 and the UE 102.

In Rel-16 NR V2X, for examples, two types of communication modes are defined for V2X communications, including Mode 1 and Mode 2. Mode 1 is designed mainly for In-Coverage (IC) UEs. In Mode 1, a BS (not shown in FIG. 1) schedules SL resource(s) to be used by a UE (e.g., the UE 101 or 102) for SL transmission(s) within configured or preconfigured SL resource pools.

In Mode 2, a UE (e.g., the UE 101 or 102) itself determines SL transmission resource(s) within one or more SL resource pools via sensing. In mode 2, a preemption and a reevaluation mechanism can be implemented to allow a UE to continue monitoring reserved resources via sensing and to determine whether the selected/reserved resources are still in the candidate resource set, or the selected/reserved resources are occupied (used) by other UEs. In a scenario in which one or more resources are not in the candidate resource set, the UE can trigger resource reselection in response to determining that a preemption/reevaluation condition has been met. Such a resource reselection mechanism is different from a normal mechanism in which only sensing and/or resource-evaluation are performed before resource reservation.

A higher layer provides a UE with a set of reserved or preselected resources for a UE. Preemption and reevaluation mechanisms can introduce issues when such mechanisms use a legacy sensing procedure or mechanism to determine whether the one or more reserved or preselected resources are still in the candidate resource set. For example, according to a legacy sensing procedure or mechanism, the UE can exclude the reserved or preselected resources due to the UE's own transmission, in addition to excluding based on detection of transmission of other UEs. Exclusion of the reserved or preselected resources due to the UE's own transmission is referred to as self-preemption. Self-preemption is not a preferred behavior for preemption and reevaluation and may cause frequent resource reselection. In addition, current self-preemption would exclude resources based on all periods allowed by a higher layer, causing unnecessary resource exclusion during sensing.

In some arrangements, a UE performs a procedure for determining a subset of resources to be reported to higher layers in resource selection (e.g., Physical SL Share Channel (PSSCH) resource selection) in SL resource allocation mode 2. In resource allocation mode 2, a higher layer can request the UE to determine a subset of resources (referred to as set $S_A$) from which the higher layer will select resources for PSSCH/PSCCH transmission. To trigger this procedure, in slot n, the higher layer provides parameters for PSSCH transmission and/or Physical SL Control Channel (PSCCH). The parameters include but are not limited to, the resource pool from which the resources are to be reported, L1 priority (referred to as $prio_{TX}$), a remaining packet delay budget, a number of sub-channels to be used for the PSSCH/PSCCH transmission in a slot (referred to as $L_{SubcH}$), a resource reservation interval (referred to as $P_{rsvp\_TX}$) in units of ms, and so on.

In some examples in which the higher layer requests the UE to determine a subset of resources from which the higher layer will select resources for PSSCH/PSCCH transmission as part of a reevaluation procedure, the higher layer provides a set of resources ($r_0$, $r_1$, $r_2$, . . . ), referred to as a first resource set, which may be subject to reevaluation. In some examples in which the higher layer requests the UE to determine a subset of resources from which the higher layer will select resources for PSSCH/PSCCH transmission as part of a preemption procedure, the higher layer provides a set of resources ($r_0'$, $r_1'$, $r_2'$, . . . ), referred to as the third resource set, which may be subject to preemption. The subset of resources $S_A$ is referred to as the second resource set.

The UE can determine the subset of resources as requested by the higher layer after the slot $r_i''-T_3$, where $r_i''$ is the slot with the smallest slot index among ($r_0$, $r_1$, $r_2$, . . . ) and ($r_0'$, $r_1'$, $r_2'$, . . . ), and $T_3$ is equal to $T_{proc,1}^{SL}$.

The embodiments of the present disclosure avoid "self-preemption" caused by a UE's own transmission (half-duplex) by avoiding the triggering of unnecessary reporting of preemption or reevaluation to a higher layer to reduce unnecessary resource reselection.

In some embodiments, the reporting conditions for reevaluation and preemption can be modified to address "self-preemption."

FIG. 2 is a flow diagram illustrating an example wireless communication method 200 for reporting reevaluation of resources, in accordance with some embodiments of the present disclosure. Referring to FIGS. 1-2, the wireless communication method 200 can be performed by the UE 101 or 102. In some examples in which the higher layer requests the UE to determine a subset of resources $S_A$ (the second resource set) from which the higher layer will select resources for PSSCH and/or PSCCH transmission as part of a reevaluation procedure, the higher layer provides a set of resources ($r_0$, $r_1$, $r_2$, . . . ), e.g., the first resource set, which may be subject to reevaluation. The first resource set ($r_0$, $r_1$, $r_2$, . . . ) configured by the higher layers for reevaluation includes resources that are preselected and not reserved.

At 210, the UE determines whether a resource (e.g., a resource $r_i$) of a first resource set ($r_0$, $r_1$, $r_2$, . . . ) excluded from a second resource set $S_A$ is associated with a valid priority. In some examples, determining whether the resource excluded from the second resource set is associated with the valid priority includes determining whether the resource is excluded from the second resource set by a hypothetical SCI (e.g., a SL SCI format 1-A). A hypothetical SCI maps to invalid priority. In other words, determining that the resource excluded from the second resource set is not associated with the valid priority includes determining that the resource is excluded by a hypothetical SL SCI.

At 220, in response to determining that the resource excluded from the second resource set is associated with the valid priority, the UE reports reevaluation of the resource to one or more higher layers. For example, in some embodiments relative to reevaluation, in response to determining that the resource $r_i$ from the first resource set ($r_0$, $r_1$, $r_2$, . . . ) is not a member of the second resource set $S_A$ and that the priority (e.g., a reception priority $prio_{RX}$) of the resource $r_i$ is a valid priority, the UE reports reevaluation of the resource $r_i$ to the one or more higher layers. In other words, in response to determining that the resource $r_i$ from the first resource set ($r_0$, $r_1$, $r_2$, . . . ) is excluded from the second resource set $S_A$ and the resource $r_i$ is not excluded from the second resource set by a hypothetical SL SCI format 1-A (e.g., a SCI with valid priority $prio_{RX}$ is detected on the resource $r_i$), the UE reports reevaluation of the resource $r_i$ to one or more higher layers. The resource $r_i$ having a valid priority $prio_{RX}$ corresponds to the resource $r_i$ not being excluded by a hypothetical SCI format 1-A or being excluded by RSRP based measurement for the received SCI format 1-A with an associated priority $rio_{RX}$. The valid priority $prio_{RX}$ is a reception priority.

On the other hand, in response to determining that the resource $r_i$ from the first resource set ($r_0$, $r_1$, $r_2$, . . . ) is not a member of the second resource set $S_A$ and that the resource $r_i$ is without a valid priority $prio_{RX}$, the UE refrains from reporting reevaluation of the resource $r_i$ to the one or more higher layers (reevaluation report is not triggered). In other words, in response to determining that a resource $r_i$ from the first resource set ($r_0$, $r_1$, $r_2$, . . . ) is excluded from the second resource set $S_A$ and the resource $r_i$ is excluded from the first resource set ($r_0$, $r_1$, $r_2$, . . . ) by a hypothetical SCI format 1-A (e.g., the resource $r_i$ has an invalid priority $prio_{RX}$), the UE does not report reevaluation of the resource $r_i$ to the one or more higher layers.

FIG. 3 is a flow diagram illustrating an example wireless communication method 300 for reporting preemption of resources, in accordance with some embodiments of the present disclosure. Referring to FIGS. 1 and 3, the wireless communication method 300 can be performed by the UE 101 or 102. In some examples in which the higher layer requests the UE to determine a subset of resources $S_A$ (the second resource set) from which the higher layer will select resources for preemption procedure, the higher layer provides a set of resources ($r_0'$, $r_1'$, $r_2'$, . . . ), e.g., the third resource set, which may be subject to preemption. The third resources set ($r_0'$, $r_1'$, $r_2'$, . . . ) configured by the higher layers for preemption check includes resources that are reserved.

At 310, the UE determines that a resource $r_i'$ of a third resource set ($r_0'$, $r_1'$, $r_2'$, . . . ) is excluded from a second resource set $S_A$ based on a RSRP measurement and that a priority threshold $prio_{pre}$ is configured. The priority threshold $prio_{pre}$ is configured corresponds to the priority threshold $prio_{pre}$ being provided by one or more higher layers, being configured by a base station, or being pre-configured by the network. In some examples, determining that the resource $r_i'$ from the third resource set ($r_0'$, $r_1'$, $r_2'$, . . . ) is not a member of the second resources set $S_A$ due to the RSRP measurement includes determining that the RSRP measurement performed for the received SCI format 1-A (e.g., Step 6 of TS 38.214 clause 8.1.4). For example, in Step 5 of TS 38.214 clause 8.1.4, the UE can exclude any resource from the second resource set $S_A$ if the UE has not monitored or has not sensed a slot due to self-preemption, and a hypothetical SCI is received in that slot, among other conditions. In Step 6, the UE can exclude a resource based on the RSRP measurement (which corresponds to an actually received and detected SCI), among other conditions. A resource can be removed from the second resource set $S_A$, if an associated SCI is detected for a related resource, and that the RSRP measured for the related resource is larger than a power threshold. The power threshold is associated with the priority of the received SCI, e.g., $prio_{RX}$ and the priority of the wanted transmission, e.g., $rio_{TX}$.

At 320, in response to determining that the resource $r_i'$ is excluded based on the RSRP measurement and that the priority threshold $prio_{pre}$ is configured, the UE reports preemption of the resource $r_i'$ to one or more higher layers. Specifically, in some examples, in response to determining that (1) the resource $r_i'$ from the third resource set ($r_0'$, $r_1'$, $r_2'$, . . . ) is not a member of the second resources set $S_A$ due to the RSRP measurement, (2) the associated priority $prio_{RX}$ is less than the priority threshold $prio_{pre}$, e.g., $prio_{RX}<prio_{pre}$, and (3) transmission priority $prio_{TX}$ is greater than the reception priority $prio_{RX}$, e.g., $prio_{TX}>prio_{RX}$, and (4) the priority threshold $prio_{pre}$ is configured, the UE reports preemption of the resource $r_i'$ to one or more higher layers. In some examples, $prio_{RX}$ refers to a priority for reception (the priority of the packets the UE is to receive), and $prio_{TX}$ refers to a priority for transmission (the priority of the packets the UE is to transmit). In some examples in which the priority threshold $prio_{pre}$ is not configured, any priority level can trigger a preemption report by the UE.

On the other hand, in response to determining that the priority threshold $prio_{pre}$ is not configured and determining that the resource $r_i'$ is not a member of the second resource set $S_A$ due to the RSRP measurement performed for the SCI with valid priority, the UE reports the preemption of the resource $r_i'$. In other words, the UE always reports preemption of the resource $r_i'$ if the priority threshold $prio_{pre}$ is not configured by or received from the higher layers.

FIG. 4 is a flow diagram illustrating an example wireless communication method 400 for reporting preemption of resources, in accordance with some embodiments of the present disclosure. Referring to FIGS. 1 and 4, the wireless communication method 400 can be performed by the UE 101 or 102. In some examples in which the higher layer requests the UE to determine a subset of resources $S_A$ (the second resource set) from which the higher layer will select resources for preemption procedure, the higher layer provides a set of resources ($r_0'$, $r_1'$, $r_2'$, . . . ), e.g., the third resource set, which may be subject to preemption. The third resources set ($r_0'$, $r_1'$, $r_2'$, . . . ) configured by the higher layers for preemption check includes resources that are reserved.

At 410, the UE determines that a resource $r_i'$ of the third resources set ($r_0'$, $r_1'$, $r_2'$, . . . ) excluded from the second resource set $S_A$ is associated with a valid priority $prio_{RX}$. At 420, in response to determining that the resource excluded from the second resource set is associated with the valid priority, the UE reports the preemption of the resource to the one or more higher layers. In other words, in response determining that the resource $r_i'$ of the third resource set ($r_0'$, $r_1'$, $r_2'$, . . . ) is not a member of the second resource set $S_A$ due to causes other than the exclusion of the hypothetical SCI format 1-A (e.g., a valid associated priority $prio_{RX}$ can be found), the UE reports the preemption of the resource $r_i'$ to the higher layers.

On the other hand, the UE may determine that the resource $r_i'$ excluded from the second resource set $S_A$ is not associated with a valid priority. In response to determining that the resource $r_i'$ excluded from the second resource set $S_A$ is not associated with a valid priority, the UE refrains from reporting preemption of the resource $r_i'$ to the one or more higher layers. Determining that the resource $r_i'$ excluded from the second resource set $S_A$ is not associated with the valid priority includes determining that the resource is excluded by a hypothetical SL SCI. In other words, in some embodiments relative to preemption, in response determining that the resource $r_i'$ of the third resource set ($r_0'$, $r_1'$, $r_2'$, . . . ) is not a member of the second resource set $S_A$ due to exclusion of a hypothetical SCI format 1-A (e.g., a valid associated priority $prio_{RX}$ cannot be found), the UE does not report preemption of the resource $r_i'$ to higher layers.

In some embodiments relative to preemption, in response to determining that the resource $r_i'$ excluded from the second resource set $S_A$ is not associated with a valid priority, The UE sets a priority associated with a hypothetical SL SCI format 1-A to a predetermined or preconfigured priority. In other words, relative to preemption, in response determining in response to determining that the resource $r_i'$ of the resource set ($r_0'$, $r_1'$, $r_2'$, . . . ) is not a member of the subset of resources $S_A$ due to exclusion of a hypothetical SCI format 1-A (e.g., a valid associated priority $prio_{RX}$ cannot be found), the UE sets the associated priority $prio_{RX}$ to a predetermined or a preconfigured priority.

In some examples, the predetermined or preconfigured value is a lowest priority value of a priority value set (corresponding to a highest priority). In some examples, the predetermined or preconfigured value is a highest priority value of a priority value set (corresponding to a lowest priority). In some examples, the predetermined or preconfigured value is neither the lowest nor the highest priority value of the priority value set (corresponding to priority that is neither the highest nor the lowest priority). In some implementations, priority is indicated by the higher layers via a priority value/index out of a priority value/index set of a predetermined number (e.g., 8) of values/indexes, where a larger value/index corresponds to a lower priority.

In some embodiments, the sensing procedure can be modified to address "self-preemption."

FIG. 5 is a flow diagram illustrating an example wireless communication method 500 for reporting preemption or re-evaluation of resources, in accordance with some embodiments of the present disclosure. Referring to FIGS. 1 and 5, the wireless communication method 500 can be performed by the UE 101 or 102 in relation to either preemption or re-evaluation. In some examples in which the higher layer requests the UE to determine a subset of resources $S_A$ (the second resource set) from which the higher layer will select resources as part of a reevaluation or preemption procedure, the higher layer respectively provides a set of resources ($r_0$, $r_1$, $r_2$, . . . ) for reevaluation and a set of resources ($r_0'$, $r_1'$, $r_2'$, . . . ) for preemption. Either the set of resources ($r_0$, $r_1$, $r_2$, . . . ) for reevaluation or the set of resources ($r_0'$, $r_1'$, $r_2'$, . . . ) for preemption is referred to as the first resource set in the method 500.

At 510, the UE determines that a hypothetical SL SCI (e.g., hypothetical SCI format 1-A) has a periodicity value, the periodicity value being a value from a value set. In some examples, the UE has not monitored a slot in which the hypothetical SCI is hypothetically. A resource reservation field in the hypothetical SCI is set to the periodicity value. The value set is one of a configured set received from higher layers or a subset of the configured set from the higher layers. The subset includes values greater than or greater than or equal to a low boundary of the value set.

For example, in some embodiments, the UE can set a low boundary or threshold for a periodicity value ($P_{Threshold}$) associated to the hypothetical SCI format 1-A, in Step 5 of TS 38.214 clause 8.1.4, to address "self-preemption" for reevaluation and/or preemption. In other words, only periodicity values P greater than the low boundary (e.g., $P \geq P_{Threshold}$) can be used for the hypothetical SCI format 1-A in Step 5. For example, in Step 5, the UE can exclude any candidate single-slot resource $R_{x,y}$ (e.g., $r_i$ or $r_i'$) from the set $S_A$ (e.g., the subset of resource) if the candidate resource meets all the following conditions: (1) the UE has not monitored slot $t_m^{SL}$ in Step 2; and (2) for any periodicity value P (1) that is greater than or equal to, greater than, or no smaller than the periodicity threshold $P_{Threshold}$ and (2) allowed by a higher layer parameter (e.g., reservationPeriodAllowed), and a hypothetical SCI format 1-A received in slot $t_m^{SL}$ with a resource reservation period field (e.g., a "Resource reservation period" field) set to that periodicity value P and indicating all subchannels of the resource pool in this slot, condition c in Step 6 would be met. The higher layer parameter indicates a periodicity list (a list of allowable periodicities) configured by the higher layers.

The UE can determine the low boundary of the periodicity value $P_{Threshold}$ using one of various schemes, including at least Scheme 1 and Scheme 2.

In Scheme 1, a higher layer, the network, or a base station can configure or preconfigure the low boundary of the periodicity value $P_{Threshold}$. The UE can receive the configured or preconfigured low boundary of the periodicity value $P_{Threshold}$ from at least one of the higher layer, the network, or the base station. In other words, the low boundary is a value configured or preconfigured by a higher layer, a network, or a base station, in some examples.

In other examples, in Scheme 2, the low boundary is one of multiple values configured or preconfigured by the higher layer, the network, or the base station. Each of the multiple values maps to a priority. Each of the multiple values corresponds to a SL priority of a priority of packets the UE is to transmit or a priority of the first resource set. In one example, a first low bound value corresponds to a first priority, a second low bound value corresponds to a second priority, . . . an nth (e.g., a $7^{th}$) low bound value corresponds to an nth (e.g., a $7^{th}$) priority. Accordingly, the higher layer, the network, or the base station can configure or preconfigure the low boundary of the periodicity value $P_{Threshold}$ based on a SL priority. For example, in Step 5, the SL priority based on which the low boundary of the periodicity value $P_{Threshold}$ is determined can be one of transmission priority $prio_{TX}$ (the priority of the packets the UE is to transmit) or the priority of the resource set ($r_0$, $r_1$, $r_2$, . . . ) or ($r_0'$, $r_1'$, $r_2'$, . . . ).

At 520, the UE determines whether a resource $r_i$ or $r_i'$ of a first resource set (e.g., ($r_0$, $r_1$, $r_2$, . . . ) or ($r_0'$, $r_1'$, $r_2'$, . . . ), respectively) is to be excluded from a second resource set $S_A$ using the hypothetical SL SCI.

In some embodiments, the reevaluation and preemption procedure can be modified to address "self-preemption."

Figure 6:
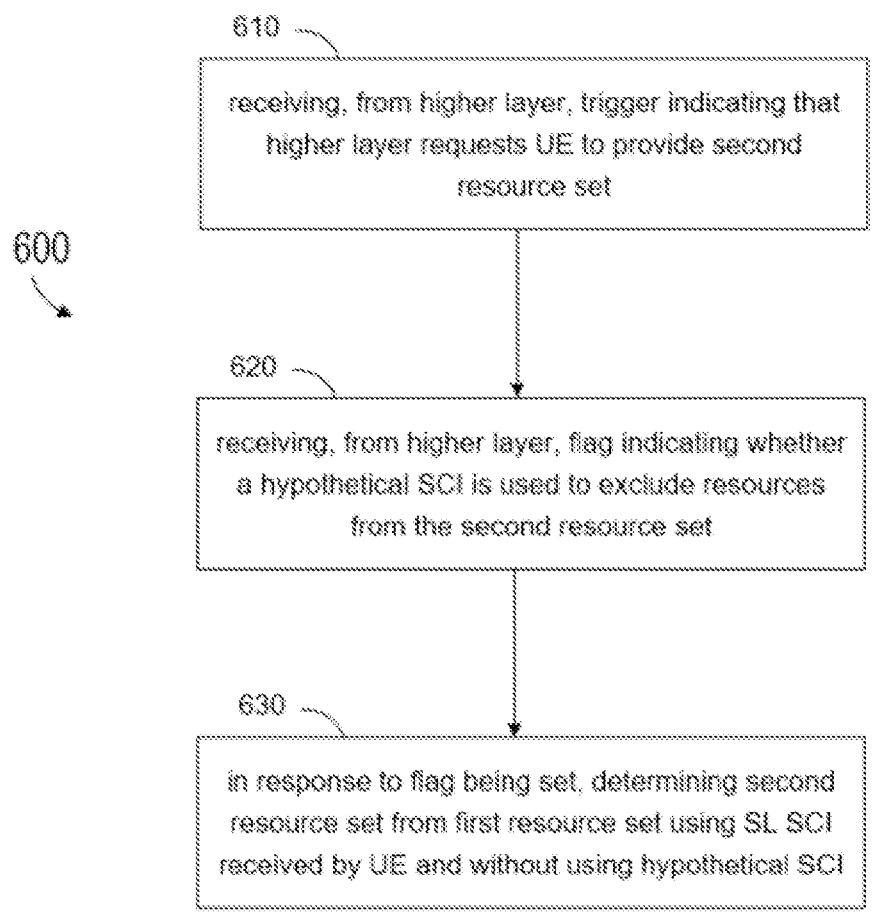
FIG. 6 is a flow diagram illustrating an example wireless communication method for reporting preemption or re-evaluation of resources, in accordance with some embodiments of the present disclosure.

FIG. 6 is a flow diagram illustrating an example wireless communication method 600 for reporting preemption or re-evaluation of resources, in accordance with some embodiments of the present disclosure. Referring to FIGS. 1 and 6, the wireless communication method 600 can be performed by the UE 101 or 102 in relation to either preemption or re-evaluation.

In some examples in which the higher layer requests the UE to determine a subset of resources from which the higher layer will select resources for PSSCH/PSCCH transmission as part of a reevaluation or preemption procedure, the higher layer provides a set of resources ($r_0$, $r_1$, $r_2$, . . . ) which may be subject to reevaluation or a set of resources ($r_0'$, $r_1'$, $r_2'$, . . . ) which may be subject to preemption. Through the reevaluation and preemption procedure (e.g., Steps 1-7 in TS 38.214 clause 8.1.4), the UE determines a subset of resources $S_A$ to report to the higher layers by determining one or more resources $r_i$ or $r_i'$ to exclude from the set of resources ($r_0$, $r_1$, $r_2$, . . . ) or ($r_0'$, $r_1'$, $r_2'$, . . . ), respectively. Either the set of resources ($r_0$, $r_1$, $r_2$, . . . ) for reevaluation or the set of resources ($r_0'$, $r_1'$, $r_2'$, . . . ) for preemption is referred to as the first resource set in the method 600.

At 610, the UE received from a higher layer a trigger indicating that the higher layer requests the UE to provide the second resource set $S_A$, e.g., for preemption or for evaluation.

At 620, the UE receives from a higher layer a flag indicating whether a hypothetical SCI is used to exclude resources from the second resource set $S_A$. At 630, in response to the flag being set, the UE determines the second resource set $S_A$ using a SCI received by the wireless communication device and without using a hypothetical SCI. The UE has not monitored the slot in which the hypothetical SCI is hypothetically received. In addition, the UE can determine that the flag has not been received or set, and in response to determining that the flag has not been received, the UE determines the second resource set $S_A$ from the first resource set using the SCI received by the UE and the hypothetical SCI.

In some examples (e.g., in Step 5 of TS 38.214 clause 8.1.4), the UE can exclude a resource $r_i$ or $r_i'$ using the hypothetical SCI format 1-A hypothetically received in a slot (e.g., slot $t_m^{SL}$) in the scenario in which the UE has not monitored slot $t_m^{SL}$ in Step 2. If the UE transmits data in the slot $t_m^{SL}$, the UE cannot monitor the slot $t_m^{SL}$ due to half-duplexing constraint. The hypothetical SCI format 1-A is not a SCI format 1-A received by UE, and the priority of a hypothetical SCI format 1-A cannot be actually determined as the hypothetical SCI format 1-A is hypothetical. In some examples (e.g., in Step 6 of TS 38.214 clause 8.1.4), the UE can exclude a resource $r_i$ or $r_i'$ using the SCI format 1-A actually received in a slot (e.g., slot $t_m^{SL}$) in the scenario in which the UE has monitored slot $t_m^{SL}$ in Step 2. The received SCI format 1-A indicates a priority associated therewith.

In some arrangements, the UE can determine whether the subset of resources $S_A$ is used by the network or the higher layers for reevaluation and/or preemption. The higher layers can indicate that the subset of resources $S_A$ is used for reevaluation and/or preemption by transmitting a flag (e.g., an indication) to the UE. In response to receiving the flag, the UE can forego or omit determining whether to exclude a resource using the hypothetical SCI format 1-A. That is, in response to receiving the flag, the UE can forego or omit Step 5 and proceeds to Step 6 from Step 4 directly, to determine a subset of resources $S_A'$. The subset of resources $S_A'$ is obtained by excluding one or more resources $r_i$ or $r_i'$ from the set of resources ($r_0$, $r_1$, $r_2$, . . . ) or ($r_0'$, $r_1'$, $r_2'$, . . . ), respectively, using the SCI format 1-A and not the hypothetical SCI format 1-A. The subset of resources $S_A'$ is then reported to the higher layers.

On the other hand, in response to determining that the flag is not received, the UE determines whether to exclude a resource using the hypothetical SCI format 1-A and the received SCI format 1-A. That is, in response to determining that the flag is not received, the UE proceeds with Step 5 and Step 6 to determine the subset of resources $S_A$. The subset of resources $S_A$ is obtained by excluding one or more resources $r_i$ or $r_i'$ from the set of resources ($r_0$, $r_1$, $r_2$, . . . ) or ($r_0'$, $r_1'$, $r_2'$, . . . ), respectively, using the SCI format 1-A and the hypothetical SCI format 1-A. The subset of resources $S_A$ is then reported to the higher layers.

Figure 7:
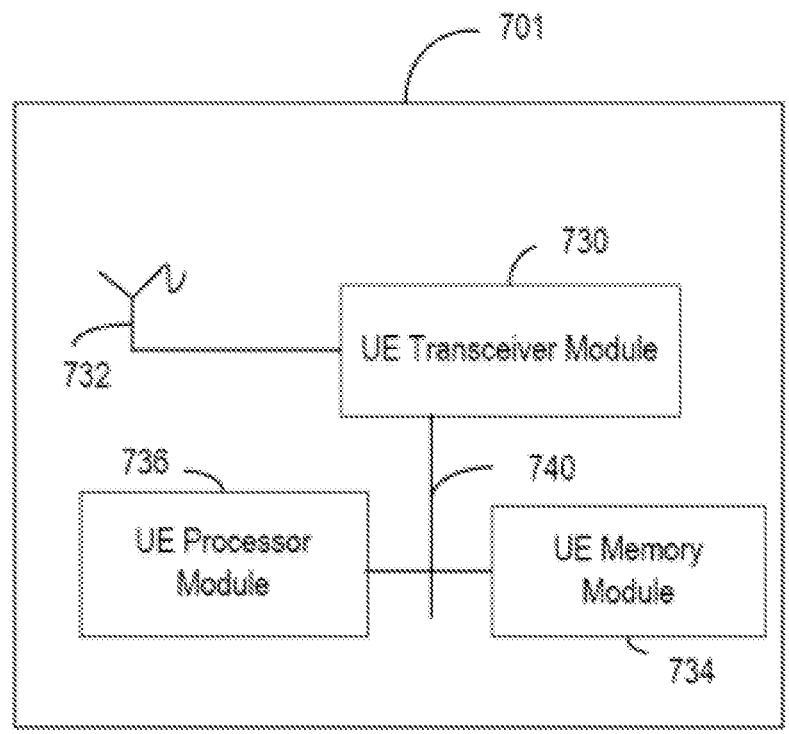
FIG. 7 illustrates a block diagram of an example UE, in accordance with some embodiments of the present disclosure.

FIG. 7 illustrates a block diagram of an example UE 701, in accordance with some embodiments of the present disclosure. Referring to FIGS. 1-7, the UE 701 (e.g., a wireless communication device, a terminal, a mobile device, a mobile user, and so on) is an example implementation of the UEs described herein, including the UEs 101 and 102. Examples of the UE 701 include a V-UE, a P-UE, a mobile phone, a smart phone, a personal digital assistant (PDA), tablet, laptop computer, wearable computing device, etc.

The UE 701 can include components and elements configured to support known or conventional operating features that need not be described in detail herein. In one illustrative embodiment, the UE 701 can be used to communicate (e.g., transmit and receive) data symbols with another UE (such as but not limited to, the UE 701) in a V2X communication or with a base station, in a wireless communication environment, as described herein. For instance, the base station can be a base station (e.g., gNB, eNB, and so on), a server, a node, or any suitable computing device used to implement various network functions.

The UE 701 includes a UE transceiver module 730, a UE antenna 732, a UE memory module 734, and a UE processor module 736. The modules 730, 732, 734, and 736 are operatively coupled to and interconnected with one another via a data communication bus 740. The UE 701 communicates with another UE or a base station via a communication channel, which can be any wireless channel or other medium suitable for transmission of data as described herein.

As would be understood by persons of ordinary skill in the art, the UE 701 can further include any number of modules other than the modules shown in FIG. 7. The various illustrative blocks, modules, circuits, and processing logic described in connection with the embodiments disclosed herein can be implemented in hardware, computer-readable software, firmware, or any practical combination thereof. To illustrate this interchangeability and compatibility of hardware, firmware, and software, various illustrative components, blocks, modules, circuits, and blocks are described generally in terms of their functionality. Whether such functionality is implemented as hardware, firmware, or software can depend upon the particular application and design constraints imposed on the overall system. The embodiments described herein can be implemented in a suitable manner for each particular application, but any implementation decisions should not be interpreted as limiting the scope of the present disclosure.

In accordance with some embodiments, the UE module transceiver 730 includes a radio frequency (RF) transmitter and a RF receiver each including circuitry that is coupled to the antenna 732. A duplex switch (not shown) may alternatively couple the RF transmitter or receiver to the antenna in time duplex fashion. The operations of the UE module transceiver 730 and the transceiver of the UE/base station can be coordinated in time such that the receiver circuitry is coupled to the antenna 732 for reception of transmissions over a wireless transmission link at the same time that the transmitter is coupled to the antenna of the other UE/base station. In some embodiments, there is close time synchronization with a minimal guard time between changes in duplex direction.

The UE module transceiver 730 and the transceiver of the other UE/baes station are configured to communicate via the wireless data communication link, and cooperate with a suitably configured RF antenna arrangement that can support a particular wireless communication protocol and modulation scheme. In some illustrative embodiments, the UE module transceiver 730 is configured to support industry standards such as the Long Term Evolution (LTE) and emerging 5G standards, and the like. It is understood, however, that the present disclosure is not necessarily limited in application to a particular standard and associated protocols. Rather, the UE module transceiver 730 may be configured to support alternate, or additional, wireless data communication protocols, including future standards or variations thereof.

The processor module 736 may be implemented, or realized, with a general purpose processor, a content addressable memory, a digital signal processor, an application specific integrated circuit, a field programmable gate array, any suitable programmable logic device, discrete gate or transistor logic, discrete hardware components, or any combination thereof, designed to perform the functions described herein. In this manner, a processor may be realized as a microprocessor, a controller, a microcontroller, a state machine, or the like. A processor may also be implemented as a combination of computing devices, e.g., a combination of a digital signal processor and a microprocessor, a plurality of microprocessors, one or more microprocessors in conjunction with a digital signal processor core, or any other such configuration.

Furthermore, the method or algorithm disclosed herein can be embodied directly in hardware, in firmware, in a software module executed by processor module 736 or in any practical combination thereof. The memory module 734 may be realized as RAM memory, flash memory, ROM memory, EPROM memory, EEPROM memory, registers, a hard disk, a removable disk, a CD-ROM, or any other form of storage medium known in the art. In this regard, memory module 734 may be coupled to the processor module 736, such that the processor module 736 can read information from, and write information to, the memory module 734. The memory module 734 may also be integrated into the processor module 736. In some embodiments, the memory module 734 may include a cache memory for storing temporary variables or other intermediate information during execution of instructions to be executed by processor module 736. Memory module 734 may also include non-volatile memory for storing instructions to be executed by the processor module 736.

While various embodiments of the present solution have been described above, it should be understood that they have been presented by way of example only, and not by way of limitation. Likewise, the various diagrams may depict an example architectural or configuration, which are provided to enable persons of ordinary skill in the art to understand example features and functions of the present solution. Such persons would understand, however, that the solution is not restricted to the illustrated example architectures or configurations, but can be implemented using a variety of alternative architectures and configurations. Additionally, as would be understood by persons of ordinary skill in the art, one or more features of one embodiment can be combined with one or more features of another embodiment described herein. Thus, the breadth and scope of the present disclosure should not be limited by any of the above-described illustrative embodiments.

It is also understood that any reference to an element herein using a designation such as "first," "second," and so forth does not generally limit the quantity or order of those elements. Rather, these designations can be used herein as a convenient means of distinguishing between two or more elements or instances of an element. Thus, a reference to first and second elements does not mean that only two elements can be employed, or that the first element must precede the second element in some manner.

Additionally, a person having ordinary skill in the art would understand that information and signals can be represented using any of a variety of different technologies and techniques. For example, data, instructions, commands, information, signals, bits and symbols, for example, which may be referenced in the above description can be represented by voltages, currents, electromagnetic waves, magnetic fields or particles, optical fields or particles, or any combination thereof.

A person of ordinary skill in the art would further appreciate that any of the various illustrative logical blocks, modules, processors, means, circuits, methods and functions described in connection with the aspects disclosed herein can be implemented by electronic hardware (e.g., a digital implementation, an analog implementation, or a combination of the two), firmware, various forms of program or design code incorporating instructions (which can be referred to herein, for convenience, as "software" or a "software module), or any combination of these techniques. To clearly illustrate this interchangeability of hardware, firmware and software, various illustrative components, blocks, modules, circuits, and blocks have been described above generally in terms of their functionality. Whether such functionality is implemented as hardware, firmware or software, or a combination of these techniques, depends upon the particular application and design constraints imposed on the overall system. Skilled artisans can implement the described functionality in various ways for each particular application, but such implementation decisions do not cause a departure from the scope of the present disclosure.

Furthermore, a person of ordinary skill in the art would understand that various illustrative logical blocks, modules, devices, components and circuits described herein can be implemented within or performed by an integrated circuit (IC) that can include a general purpose processor, a digital signal processor (DSP), an application specific integrated circuit (ASIC), a field programmable gate array (FPGA) or other programmable logic device, or any combination thereof. The logical blocks, modules, and circuits can further include antennas and/or transceivers to communicate with various components within the network or within the device. A general purpose processor can be a microprocessor, but in the alternative, the processor can be any conventional processor, controller, or state machine. A processor can also be implemented as a combination of computing devices, e.g., a combination of a DSP and a microprocessor, a plurality of microprocessors, one or more microprocessors in conjunction with a DSP core, or any other suitable configuration to perform the functions described herein.

If implemented in software, the functions can be stored as one or more instructions or code on a computer-readable medium. Thus, the blocks of a method or algorithm disclosed herein can be implemented as software stored on a computer-readable medium. Computer-readable media includes both computer storage media and communication media including any medium that can be enabled to transfer a computer program or code from one place to another. A storage media can be any available media that can be accessed by a computer. By way of example, and not limitation, such computer-readable media can include RAM, ROM, EEPROM, CD-ROM or other optical disk storage, magnetic disk storage or other magnetic storage devices, or any other medium that can be used to store desired program code in the form of instructions or data structures and that can be accessed by a computer.

In this document, the term "module" as used herein, refers to software, firmware, hardware, and any combination of these elements for performing the associated functions described herein. Additionally, for purpose of discussion, the various modules are described as discrete modules; however, as would be apparent to one of ordinary skill in the art, two or more modules may be combined to form a single module that performs the associated functions according embodiments of the present solution.

Additionally, memory or other storage, as well as communication components, may be employed in embodiments of the present solution. It will be appreciated that, for clarity purposes, the above description has described embodiments of the present solution with reference to different functional units and processors. However, it will be apparent that any suitable distribution of functionality between different functional units, processing logic elements or domains may be used without detracting from the present solution. For example, functionality illustrated to be performed by separate processing logic elements, or controllers, may be performed by the same processing logic element, or controller. Hence, references to specific functional units are only references to a suitable means for providing the described functionality, rather than indicative of a strict logical or physical structure or organization.

Various modifications to the implementations described in this disclosure will be readily apparent to those skilled in the art, and the general principles defined herein can be applied to other implementations without departing from the scope of this disclosure. Thus, the disclosure is not intended to be limited to the implementations shown herein, but is to be accorded the widest scope consistent with the novel features and principles disclosed herein, as recited in the claims below.

The invention claimed is:

1. A wireless communication method, comprising:
  determining, by a wireless communication device, whether a resource of a first resource set excluded from a second resource set is associated with a valid priority; and
  in response to determining that the resource excluded from the second resource set is associated with the valid priority, reporting reevaluation of the resource to one or more higher layers.

2. The wireless communication method of claim 1, wherein determining whether the resource excluded from the second resource set is associated with the valid priority comprises determining whether the resource is excluded from the second resource set by a hypothetical Sidelink (SL) Control Information (SCI).

3. The wireless communication method of claim 2, comprising determining that the resource excluded from the second resource set is not associated with the valid priority, which comprises determining that the resource is excluded by the hypothetical SL SCI.

4. A wireless communication method, comprising:
  determining, by a wireless communication device, that a resource of a third resource set is excluded from a second resource set based on a Reference Signal Receive Power (RSRP) measurement and that a priority threshold $prio_{pre}$ is configured;
  in response to determining that the resource is excluded based on the RSRP measurement and that the priority threshold $prio_{pre}$ is configured, reporting preemption of the resource to one or more higher layers; and
  in response to determining that the priority threshold $prio_{pre}$ is not configured and determining that the resource is not a member of the second resource set due to the RSRP measurement performed for the SCI with valid priority, reporting, by the wireless communication device, the preemption of the resource.

5. The wireless communication method of claim 4, wherein
  in response to determining that the priority threshold $prio_{pre}$ is configured, the preemption of the resource is reported in response to determining that (1) the resource is not a member of the second resource set due to the RSRP measurement, (2) an associated reception priority $prio_{RX}$ is less than the priority threshold $prio_{pre}$, and (3) a transmission priority $prio_{TX}$ is greater than the reception priority $prio_{RX}$.

6. The wireless communication method of claim 2, comprising:
  determining, by a wireless communication device, that the hypothetical SLSCI has a periodicity value, the periodicity value being a value from a value set.

7. The wireless communication method of claim 6, wherein
  the wireless communication device has not monitored a slot;
  the hypothetical SL SCI is received hypothetically in the slot; and a resource reservation field in the hypothetical SL SCI is set to the periodicity value.

8. The wireless communication method of claim 6, wherein
the value set is one of:
a configured set received from higher layer; or
a subset of the configured set from the higher layer, the subset comprising values greater than, or greater than or equal to, a low boundary of the value set.

9. The wireless communication method of claim 8, wherein
the low boundary is a value configured or preconfigured by a higher layer, a network, or a base station; or
the low boundary is one of multiple values configured or preconfigured by the higher layer, the network, or the base station, each of the multiple values mapping to a priority, wherein the one of the multiple values corresponds to a SL priority of a priority of packets the wireless communication device is to transmit or a priority of the first resource set.

10. A wireless communication device, comprising:
at least one processor configured to:
determine whether a resource of a first resource set excluded from a second resource set is associated with a valid priority; and
in response to determining that the resource excluded from the second resource set is associated with the valid priority, report reevaluation of the resource to one or more higher layers.

11. The wireless communication device of claim 10, wherein to determine whether the resource excluded from the second resource set is associated with the valid priority comprises to determine whether the resource is excluded from the second resource set by a hypothetical Sidelink (SL) Control Information (SCI).

12. The wireless communication device of claim 11, wherein the at least one processor are configured to determine that the resource excluded from the second resource set is not associated with the valid priority, which comprises determining that the resource is excluded by the hypothetical SL SCI.

13. The wireless communication device of claim 11, wherein the at least one processor are configured to:
determine that the hypothetical SL SCI has a periodicity value, the periodicity value being a value from a value set.

14. The wireless communication device of claim 13, wherein
the wireless communication device has not monitored a slot;

the hypothetical SL SCI is received hypothetically in the slot; and
a resource reservation field in the hypothetical SL SCI is set to the periodicity value.

15. The wireless communication device of claim 13, wherein the value set is one of:
a configured set received from higher layer; or
a subset of the configured set from the higher layer, the subset comprising values greater than, or greater than or equal to, a low boundary of the value set.

16. The wireless communication device of claim 15, wherein
the low boundary is a value configured or preconfigured by a higher layer, a network, or a base station; or
the low boundary is one of multiple values configured or preconfigured by the higher layer, the network, or the base station, each of the multiple values mapping to a priority, wherein the one of the multiple values corresponds to a SL priority of a priority of packets the wireless communication device is to transmit or a priority of the first resource set.

17. A wireless communication device, comprising:
at least one processor configured to:
determine that a resource of a third resource set is excluded from a second resource set based on a Reference Signal Receive Power (RSRP) measurement and that a priority threshold $prio_{pre}$ is configured;
in response to determining that the resource is excluded based on the RSRP measurement and that the priority threshold $prio_{pre}$ is configured, report preemption of the resource to one or more higher layers; and
in response to determining that the priority threshold $prio_{pre}$ is not configured and that the resource is not a member of the second resource set due to the RSRP measurement performed for the SCI with valid priority, report the preemption of the resource.

18. The wireless communication device of claim 17, wherein the at least one processor are configured to:
in response to determining that the priority threshold $prio_{pre}$ is configured, report the preemption of the resource in response to determining that (1) the resource is not a member of the second resource set due to the RSRP measurement, (2) an associated reception priority $prio_{RX}$ is less than the priority threshold $prio_{pre}$, and (3) a transmission priority $prio_{TX}$ is greater than the reception priority $prio_{RX}$.

* * * * *